(12) United States Patent  
Linkletter et al.

(10) Patent No.: US 7,377,406 B2
(45) Date of Patent: May 27, 2008

(54) TWO STAGE GREASE GUN

(75) Inventors: Don R. Linkletter, Cedar Rapids, IA (US); R. Mark Weems, Cedar Rapids, IA (US)

(73) Assignee: Weems Industries, Inc., Marion, IA (US)

( * ) Notice: Subject to any disclaimer, the term of this patent is extended or adjusted under 35 U.S.C. 154(b) by 0 days.

(21) Appl. No.: 11/365,782

(22) Filed: Mar. 1, 2006

(65) Prior Publication Data

US 2006/0231576 A1    Oct. 19, 2006

Related U.S. Application Data

(63) Continuation-in-part of application No. 11/106,417, filed on Apr. 14, 2005.

(51) Int. Cl.
*G01F 11/00* (2006.01)
*F01B 7/00* (2006.01)
*F01M 11/04* (2006.01)

(52) U.S. Cl. .............. 222/256; 222/309; 222/260; 222/378; 417/487; 92/62; 184/105.2

(58) Field of Classification Search ........ 222/256–263, 222/340, 324, 323, 525, 523, 309, 372, 378; 417/487; 92/194, 62, 63, 65; 184/105.1, 184/28, 105.2, 45.2, 38.2; 95/194, 62, 63, 95/65

See application file for complete search history.

(56) References Cited

U.S. PATENT DOCUMENTS

| | | | |
|---|---|---|---|
| 1,611,241 A * | 12/1926 | Sanford | ............. 222/523 |
| 1,639,409 A * | 8/1927 | Johnson et al. | ............. 222/324 |
| 1,743,968 A | 1/1930 | Hatfield | |
| 1,775,946 A | 9/1930 | Reid | |
| 1,868,701 A | 7/1932 | Goerland | |
| 1,915,443 A * | 6/1933 | Pelouch | ............. 222/318 |
| 1,938,130 A | 12/1933 | Ayer et al. | |
| 1,949,761 A | 3/1934 | Rea | |
| 1,972,181 A | 9/1934 | Chambers | |
| 1,995,377 A * | 3/1935 | Creveling | ............. 141/347 |
| 2,074,570 A | 3/1937 | Smith et al. | |
| 2,082,521 A * | 6/1937 | Schneider et al. | ............. 141/285 |
| 2,205,667 A * | 6/1940 | Plummer et al. | ............. 222/263 |
| 2,220,297 A * | 11/1940 | Smith | ............. 222/254 |
| 2,284,533 A * | 5/1942 | Neuman | ............. 222/260 |
| 2,833,449 A | 6/1958 | Morton | |
| 2,928,574 A | 3/1960 | Wagner | |

(Continued)

*Primary Examiner*—Kevin Shaver
*Assistant Examiner*—Stephanie E. Tyler
(74) *Attorney, Agent, or Firm*—Brian J. Laurenzo; Jason M. Hunt; Dorsey & Whitney LLP

(57) ABSTRACT

A portable grease gun with a dual pressure output capability which can be selectively changed by the user with little effort. The larger diameter plunger is slidable within a plunger retainer. The larger diameter plunger has a bore through them in which a smaller diameter plunger is slidable. The smaller diameter plunger moves when an actuating lever is operated to compress grease in the grease gun. The larger diameter plunger may be adjusted to remain static during operation of the actuating lever or it may be adjusted to move during all or part of the compression stroke of the actuating lever. A high pressure can be generated by movement of the smaller diameter plunger alone, or a high flow volume can be generated by movement of the smaller and larger diameter plungers in unison.

15 Claims, 15 Drawing Sheets

U.S. PATENT DOCUMENTS

| | | | |
|---|---|---|---|
| 3,209,957 A | * 10/1965 | Sundholm | 222/340 |
| 4,113,151 A | 9/1978 | Brown | |
| 4,142,654 A | * 3/1979 | Doubleday et al. | 222/309 |
| 4,257,540 A | 3/1981 | Wegmann et al. | |
| 4,664,298 A | 5/1987 | Shew | |
| D295,599 S | 5/1988 | Shew | |
| 5,277,339 A | 1/1994 | Shew et al. | |
| 6,817,492 B1 | * 11/2004 | Smith | 222/390 |

* cited by examiner

TWO STAGE GREASE GUN

CROSS-REFERENCE TO RELATED APPLICATIONS

This application is a continuation-in-part of application Ser. No. 11/106,417 titled Two Stage Grease Gun, filed on Apr. 14, 2005, with the United States Patent and Trademark Office. The disclosure of application Ser. No. 11/106,417 is hereby incorporated in its entirety.

BACKGROUND OF THE INVENTION

The present invention pertains to portable grease guns, whether manually operated or driven by air power or by electric batteries. Typical hand operated grease guns include a piston which forces grease from a nozzle, the grease being fed to the compression chamber from an attached mounted barrel containing bulk grease or a grease cartridge. Most existing grease guns provide only one output pressure of the grease expressed from the gun.

Frequently the user of a grease gun encounters a grease zerk which will not accept grease because it is seized or clogged. In that case, little can be done without replacing the zerk to correct the problem. One prior art grease gun requires changing position of the handle to adjust the mechanical advantage. This device cannot provide the 4:1 ratio pressure increase needed to overcome a resistant zerk. Another prior art grease gun uses a complex labyrinth and a mechanical switch to engage or disengage a ball check valve to vary pressure of grease exiting the grease gun. This device does not permit supply to the grease gun from an attached barrel and therefore the portability and versatility of the device is limited.

The foregoing problems are addressed by the present two stage grease gun invention.

BRIEF SUMMARY OF THE INVENTION

A portable grease gun is provided with a dual pressure output capability which can be selectively changed by the user with little effort. The grease gun includes a plunger assembly which includes a larger diameter volume plunger which is selectively coupled longitudinally to a plunger extension by screw threads. The length of the volume plunger with the plunger extension attached may be varied by inserting the extension into the bore of the volume plunger a greater or lesser amount. This is accomplished by rotating the plunger extension relative to the volume plunger thereby moving the coupled end of the plunger extension in and out of the screw threads within the bore of the volume plunger. The volume plunger and its plunger extension are received in a longitudinal passageway of a plunger retainer which limits the longitudinal movement of the volume plunger, and prevents rotational movement of the volume plunger relative to the plunger retainer. A smaller diameter pressure plunger is slidable within the bore through the volume plunger and the attached plunger extension. The plunger assembly is longitudinally received within a bore of the grease gun body.

An actuating lever is pivotal upon the grease gun body which includes the plunger assembly within the longitudinal bore through the body. The lever includes a push block which abuts the plunger assembly to urge the pressure plunger and selectively the volume plunger toward the output orifice of the grease gun.

The desired pressure of the grease expelled from the grease gun body is controlled by selective rotation of the plunger extension to shorten or extend the effective length of the volume plunger and plunger extension combination. When the plunger extension is maximally received into the bore of the volume plunger, the volume plunger is prevented from longitudinal travel. However, the smaller diameter pressure plunger may slide along the bores of the volume plunger and the plunger extension, traveling into the compression chamber to pressurize grease at a high pressure and low volume. When the plunger extension is minimally received within the bore of the volume plunger, the effective length of the volume plunger and plunger extension combination is increased, allowing the volume plunger to be moved into the compression chamber when the push block of the actuating lever applies force to the end of the pressure plunger and the plunger extension, causing both the volume plunger and the pressure plunger to move in concert.

When the plunger extension is moved to an intermediate insertion within the bore of the volume plunger, the actuation of the lever will first cause movement of the pressure plunger alone, providing a high pressure grease delivery during the first part of the stroke of the actuating lever and subsequently a low pressure grease delivery when the push block begins to abut the plunger extension and the pressure plunger together, thereby urging both the pressure plunger and the volume pressure together toward the output body of the grease gun. The grease gun can therefore be used to apply high pressure grease to a resistant zerk during the first part of the stroke of the actuating lever and then to deliver high volume grease at low pressure after the resistance of the zerk is overcome.

It is a primary object of the invention to provide a portable grease gun which can be adjusted to deliver grease at high pressure and low volume or at low pressure and high volume. It is a further object of the invention to provide a portable grease gun which can be adjusted to overcome a clogged or seized zerk and then to inject grease into the corrected zerk at lower pressure and higher volume. It is also an object of the invention to provide a grease gun which is easily adjusted for pressure output by the user without tools. It is an additional object of the invention to provide an easily manufactured grease gun which will expel grease at more than one pressure.

BRIEF DESCRIPTION OF THE SEVERAL VIEWS OF THE DRAWING(S)

DETAILED DESCRIPTION OF THE INVENTION

Figure 1:
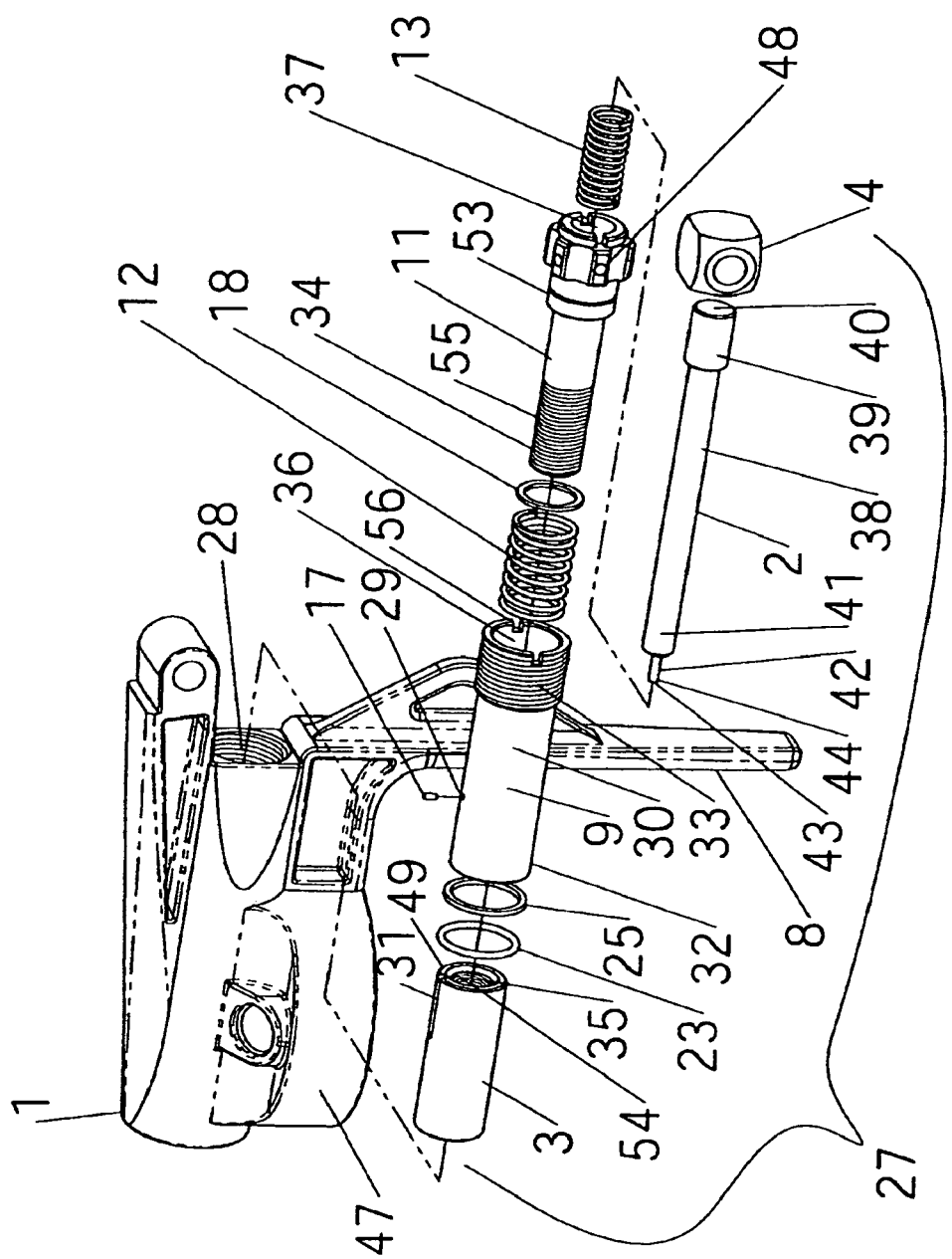
FIG. 1 is an exploded view in perspective of a preferred embodiment grease gun according to the present invention.

Reference is drawn to FIGS. 1-8 and specifically to FIG. 1, initially. FIG. 1 discloses a grease gun body 1 according to the present invention with the plunger assembly 27 thereof shown in exploded view. Plunger assembly 27 is received within longitudinal bore 28 of grease gun body 1. Plunger assembly 27 comprises a volume plunger 3 which is slidably received within an elongate hollow cylindrical plunger retainer 9. Plunger retainer 9 is provided with an opening 29 on its sidewall 30 into which guide pin 17 is received. Volume plunger 3 includes an elongate slot 31 into which guide pin 17 may extend such that volume plunger 3 is prevented from rotation relative to plunger retainer 9, while remaining free to move longitudinally within plunger retainer 9 over a range limited by a stop within plunger retainer 9.

O-ring 23 and backup ring 25 are received on inner end 32 of plunger retainer 9. Opposing outer end 33 of plunger retainer 9 is threaded to be received in threaded bore 28. Slots 56 are provided on outer end 33 to aid threading plunger retainer 9 into bore 28.

Plunger extension 11 is received in longitudinal bore 36 of plunger retainer 9 and is coaxially retained to volume plunger 3, at a selected depth, by selective insertion of inner end 34 of plunger extension 11 into passageway 35 of volume plunger 3. Threads 55 on inner end 34 of plunger extension 11 mate with internal threads 54 within passageway 35 of volume plunger 3. Plunger extension 11 with volume plunger 3 attached coaxially thereto is biased toward push block 4 by volume plunger spring 12. Bearing ring 18 provides a sliding surface between shoulder 53 of plunger extension 11 and volume plunger spring 12.

By rotating plunger extension 11 clockwise or counter-clockwise, the effective length of the coaxially connected plunger extension 11 and volume plunger 3 may be selected. Thumb wheel 48 on plunger extension 11 facilitates rotation thereof by the user.

Pressure plunger 2 is slidably received within the longitudinal bore 37 of plunger extension 11 and the longitudinal passageway 35 of volume plunger 3 and is biased toward push block 4 by pressure plunger spring 13. Pressure plunger 2 comprises inner end 41 from which extends needle 42 having pressure face 43 on free end 44 thereof.

Volume plunger 3 is slidable over a limited range within the longitudinal bore 36 of plunger retainer 9. Guide pin 17 is received in sidewall 30 of plunger retainer 9 and rides in slot 31 of volume plunger 3.

The range of longitudinal retroactive movement of volume plunger 3 is limited by an internal stop 57 (see FIG. 6) spaced apart from inner end 32 of plunger retainer 9. Volume plunger 3 comprises a counterbore 50 extending from outer end 49 part way therethrough. Counterbore 50 accommodates inner end 34 of plunger extension 11 while the remainder of passageway 35 is reduced in size to accommodate body 38 of pressure plunger 2 for sliding movement therealong.

To reach into and be slidable within passageway 35 of volume plunger 3, pressure plunger must pass along bore 37 of plunger extension 11. Pressure plunger spring 13 biases head 39 of pressure plunger 2 longitudinally outward along bore 37 while volume plunger spring 12 biases the interconnected plunger extension 11 and volume plunger 3 longitudinally outwardly along bore 36. Inward longitudinal travel of volume plunger 3 is limited by contact of the thumb wheel 48 against outer end 33 of plunger retainer 9.

Figure 2:
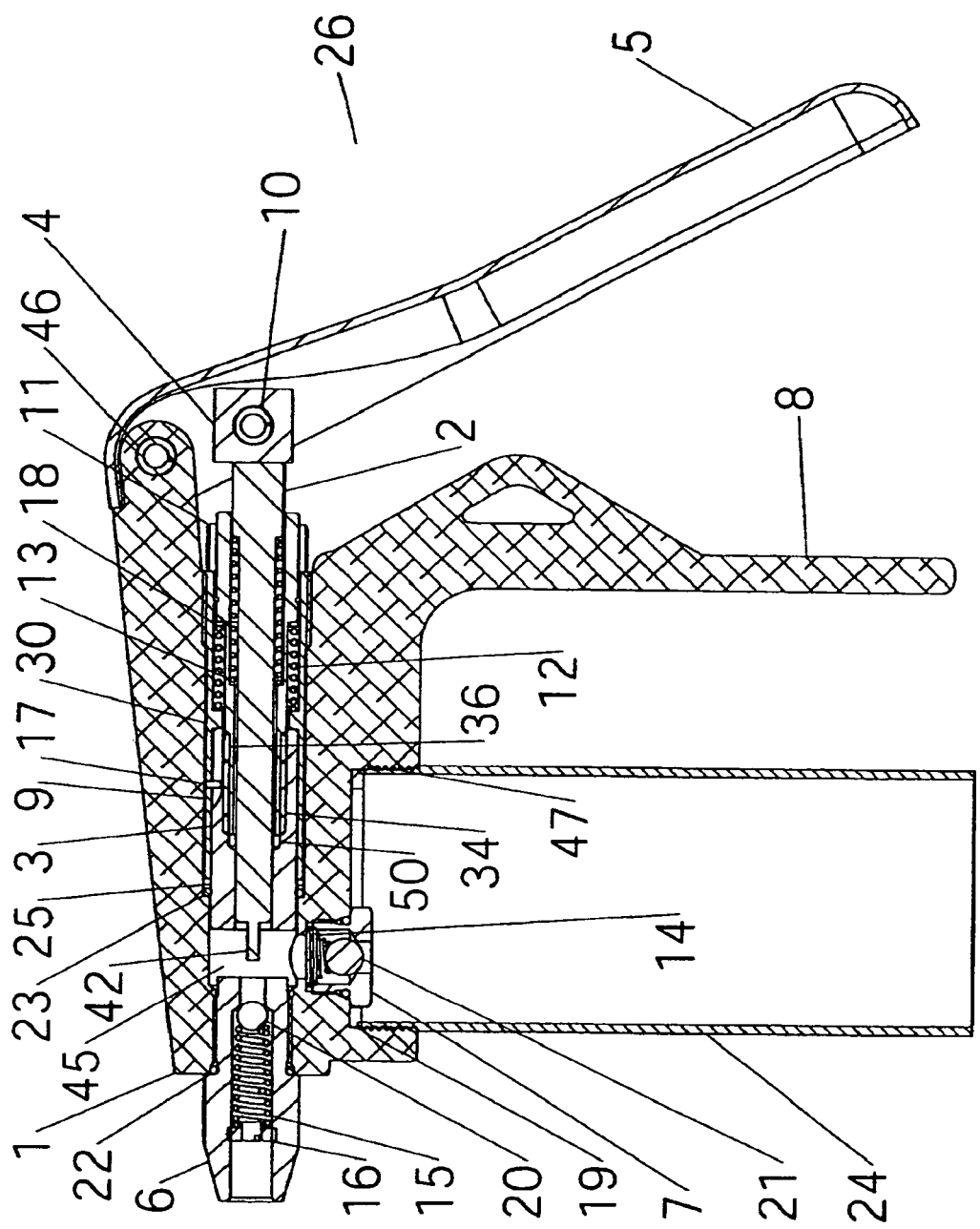
FIG. 2 is a cross section of the preferred embodiment of the invention shown with the actuating lever fully retracted and with the plunger assembly adjusted for delivery of grease at high pressure and low volume as the actuating lever is moved toward the handle.
Figure 3:
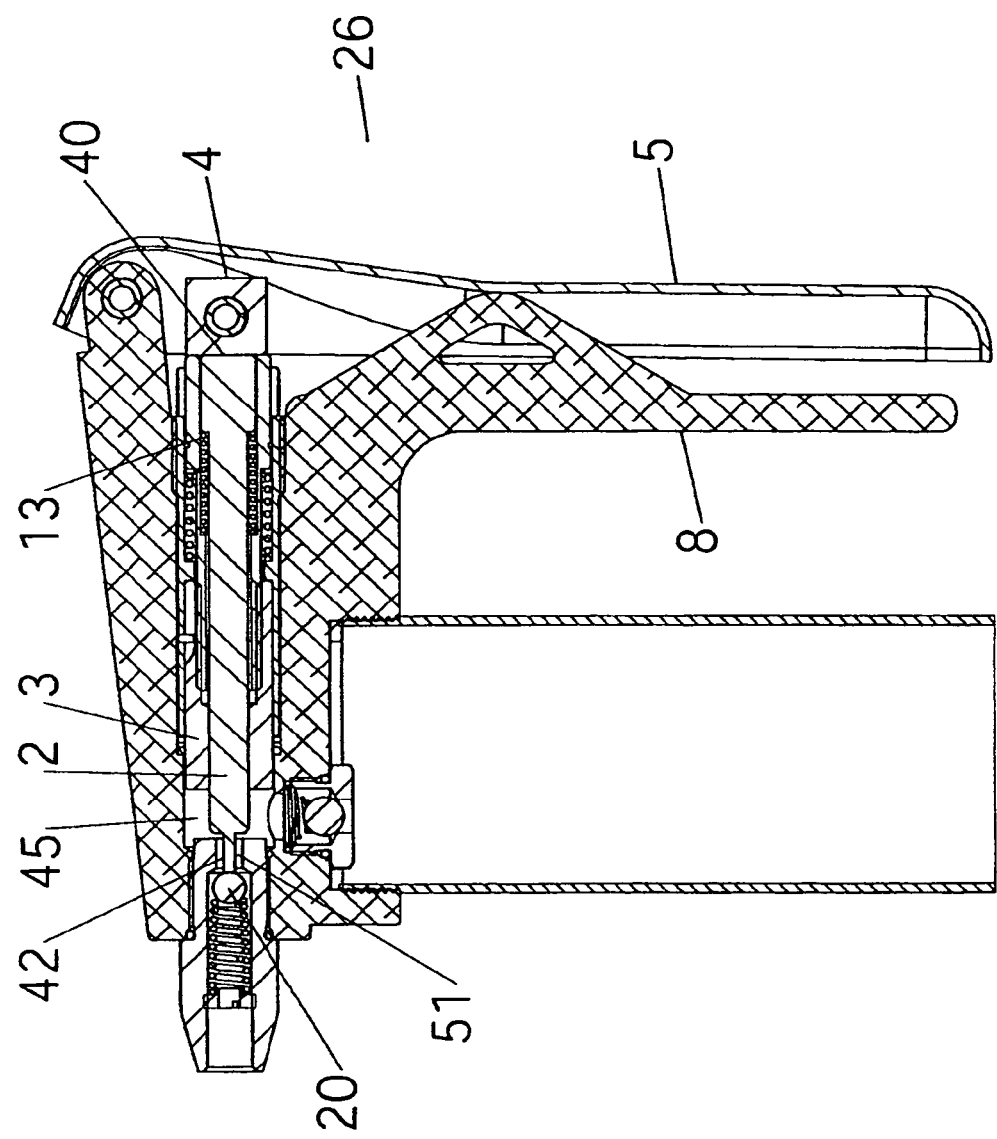
FIG. 3 is a cross section of the preferred embodiment of the grease gun adjusted as in FIG. 2 but with the actuating lever abutted to the handle of the grease gun and the pressure plunger advanced to the outlet check valve.

Referring now to FIGS. 2 and 3, grease gun 26 further comprises an actuating lever 5 pivotally retained to grease gun body 1 by hinge pin 46. Push block 4 is retained to actuating lever 5 by spring pin 10 allowing push block 4 to rotate about spring pin 10 in order to maintain a flat surface against outer end face 40 of pressure plunger 2.

Handle 8 depends from grease gun body 1 at an approximate perpendicular to the longitudinal axis of grease gun body 1. Output body 6, which may be a nozzle, is received within longitudinal bore 28 grease gun body 1 at output end 22 and includes an output check ball 20 biased by output spring 15 which is retained in output body 6 by output check screw 16.

Grease gun body 1 further comprises a barrel mount 47 which houses inlet valve body 7, which includes valve spring 14 which biases inlet check ball 21. A barrel 24 may be selectively mounted to grease gun body 1 at barrel mount 47. Grease gun 26 is shown with the inner end 34 of plunger extension 11 substantially fully inserted into counterbore 50 of volume plunger 3. In this condition, grease gun 26 is adjusted to deliver grease at a high pressure.

In FIG. 2, the grease gun 26 as shown is ready to begin to expel grease from compression chamber 45 through output body 6 at high pressure, that is, in the range of about 10,000 psi. Actuating lever 5 has been retracted from handle 8 allowing pressure plunger spring 13 to urge pressure plunger 2 to follow push block 4 as it retreats from grease gun body 1 as it is carried on spring pin 10 on actuating lever 5. Volume plunger 3 is maximally retracted from compression chamber 45 while needle 42 of pressure plunger 2 remains partially within compression chamber 45. Compression chamber 45 may be filled with grease which passes inlet check ball 21 from barrel 24.

FIG. 3 discloses the position of the plunger elements after actuating lever 5 has been moved back to rest against handle 8. Volume plunger 3 remains in the same position as in FIG. 2 while pressure plunger 2 has further protruded into compression chamber 45 with needle 42 thereof inserted within the output duct 51 thereby forcing grease from compression chamber 45 past outlet check ball 20. The force upon outer end face 40 of pressure plunger 2 exerted by push block 4 compresses pressure plunger spring 13.

Figure 4:
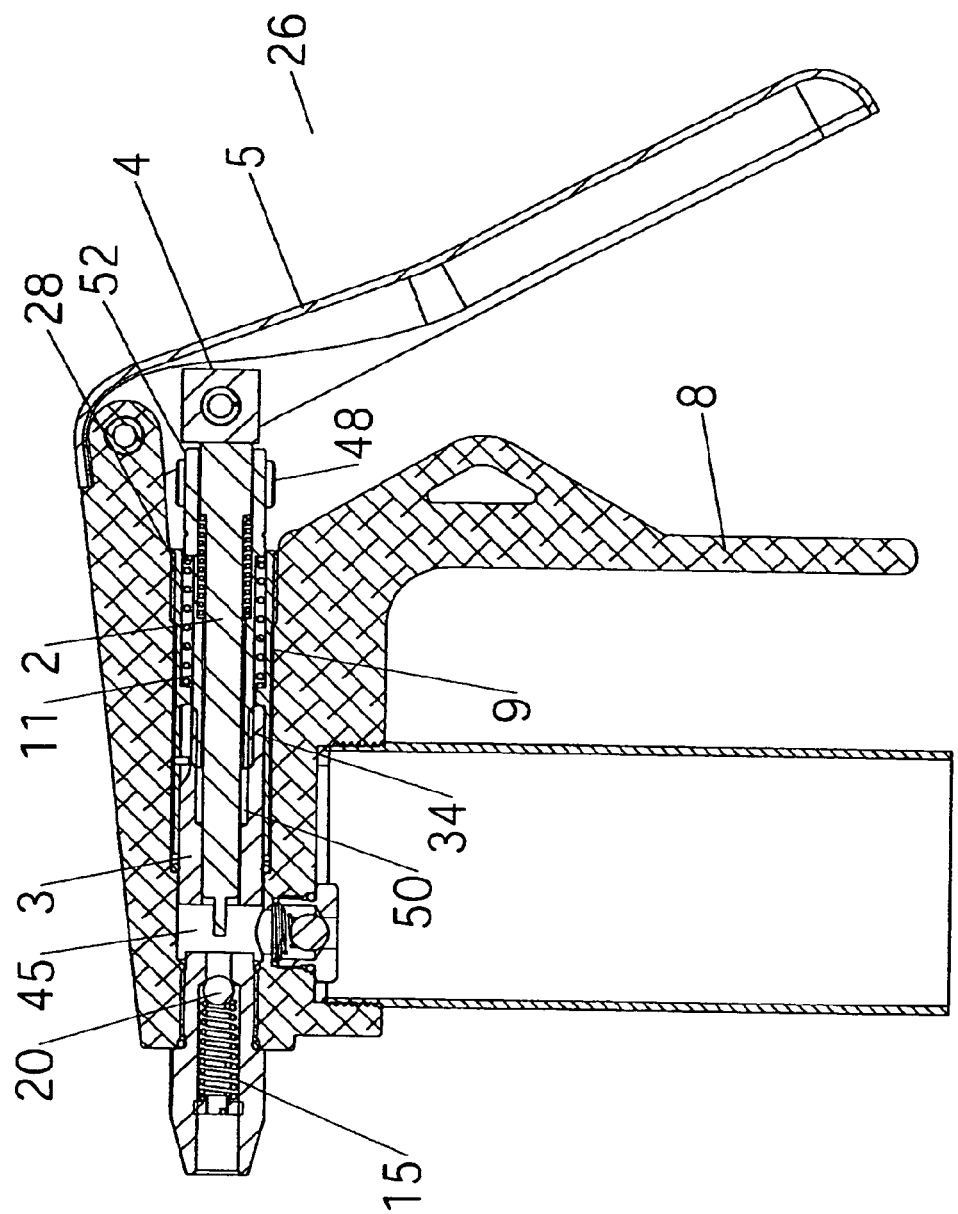
FIG. 4 is a cross section of the preferred embodiment of the invention shown with the actuating lever fully retracted and with the plunger assembly adjusted for delivery of grease at low pressure and high volume as the actuating lever is moved toward the handle.
Figure 5:
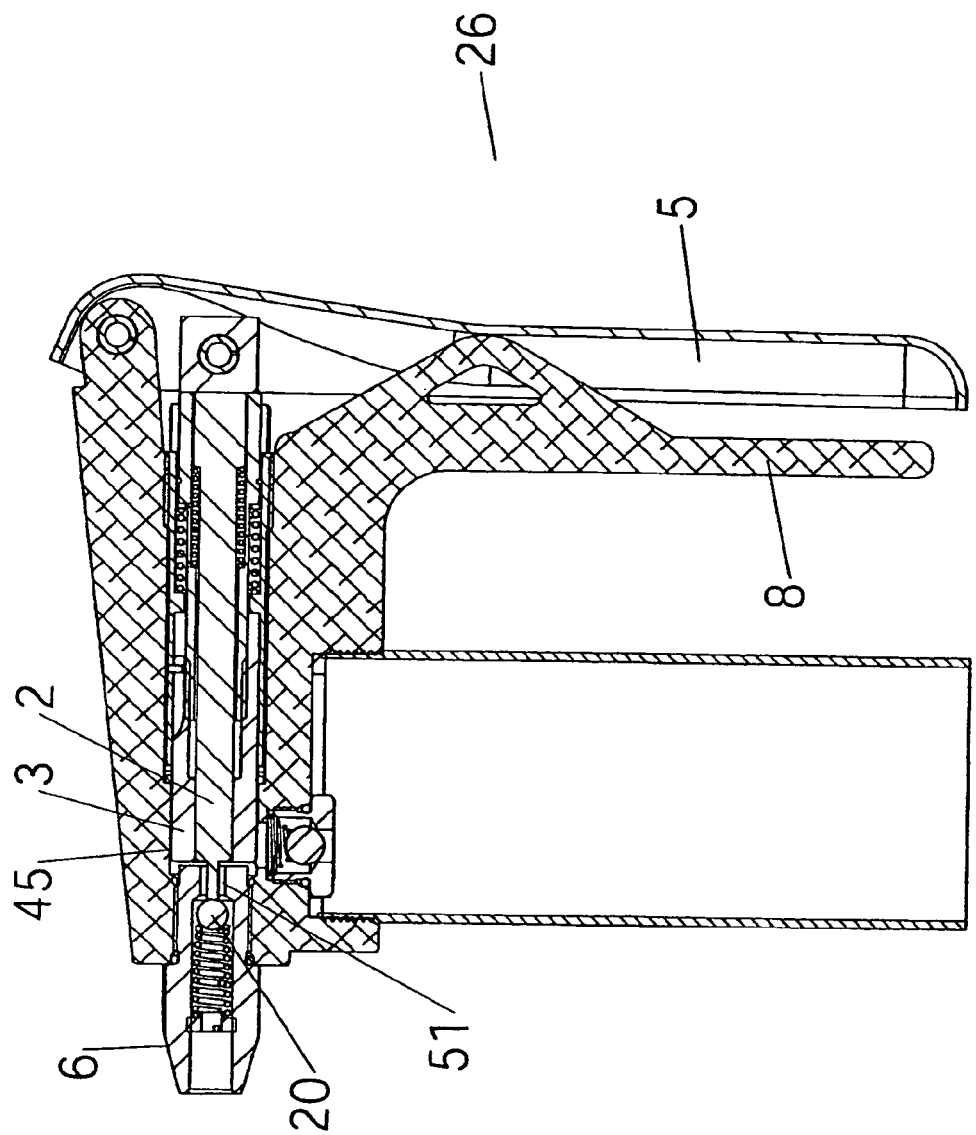
FIG. 5 is a cross section of the preferred embodiment of the grease gun adjusted as in FIG. 4, but with the actuating lever abutted to the handle of the grease gun and with both the pressure plunger and the volume plunger fully advanced into the compression chamber of the grease gun.

Referring now to FIGS. 4 and 5, grease gun 26 is illustrated in condition to expel a large volume of grease at a low pressure. FIG. 4 shows the location of pressure plunger 2 and volume plunger 3 when actuating lever 5 is maximally retracted from handle 8. In the condition of grease gun 26 in FIGS. 4 and 5, plunger extension 11 has been retracted from counterbore 50 of volume plunger 3 by selective rotation of plunger extension 11 by manipulation of thumb wheel 48 thereof effectively unscrewing inner end 34 of plunger extension 11 from counterbore 50. This effectively extends the length of the combined volume plunger 3 and plunger extension 11, allowing outer end 52 of plunger extension 11 to extend from longitudinal bore 28 and from plunger retainer 9. As should be understood, as actuating lever 5 starts to move toward handle 8, push block 4 forces both pressure plunger 2 and volume plunger 3 toward output body 6 across compression chamber 45. This movement causes volume plunger 3 combined with pressure plunger 2 to force a large volume of grease at low pressure past output check ball 20 against output spring 15.

After actuating lever 5 has been fully rotated into abutment on handle 8, as shown in FIG. 5, volume plunger 3 as well as pressure plunger 2 have traversed compression chamber 45 toward output duct 51 causing low pressure grease to pass along output duct 51 and pass output check ball 20 of output body 6.

Figure 6:
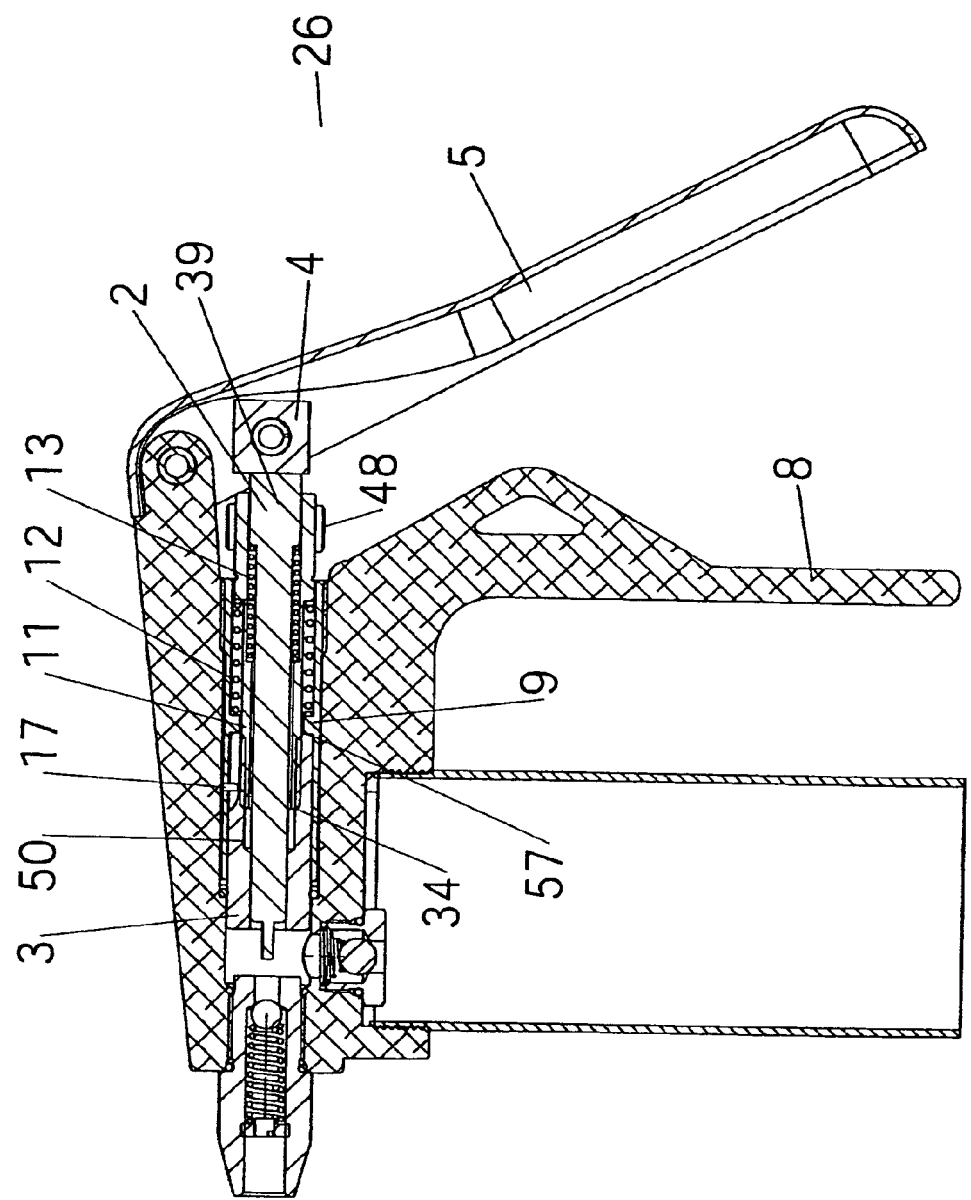
FIG. 6 is a cross section of the preferred embodiment of the invention shown with the actuating lever fully retracted and with the plunger assembly adjusted for delivery of grease at high pressure during the beginning portion of the stroke of the actuating lever and at low pressure during the remainder of the stroke.
Figure 7:
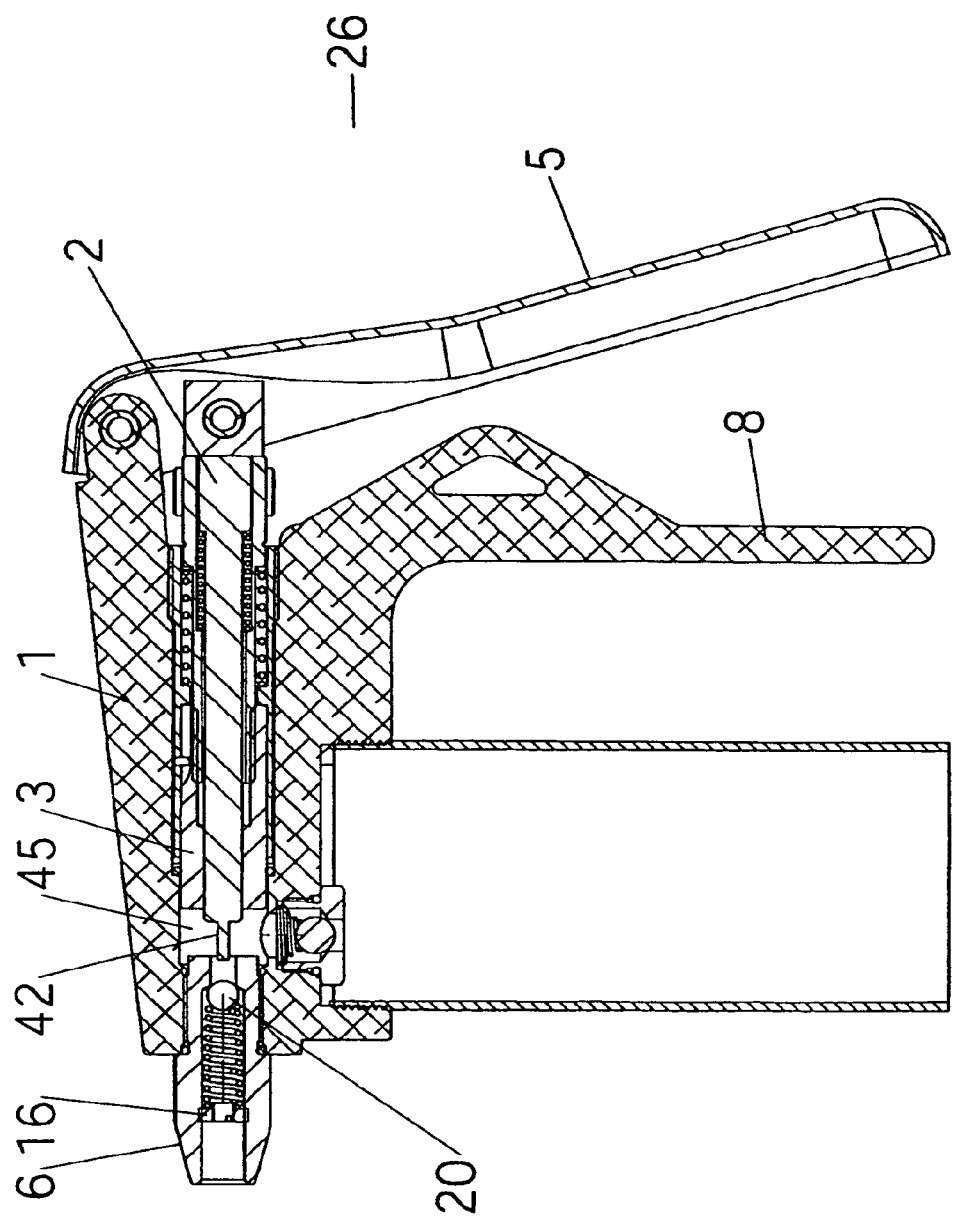
FIG. 7 is a cross section of the preferred embodiment of the grease gun adjusted as in FIG. 6 with the actuating lever actuated part way such that the high pressure portion of the stroke is completed and the plunger assembly is in position for delivery of grease at high volume and low pressure for the remainder of the stroke of the actuating lever toward the handle.
Figure 8:
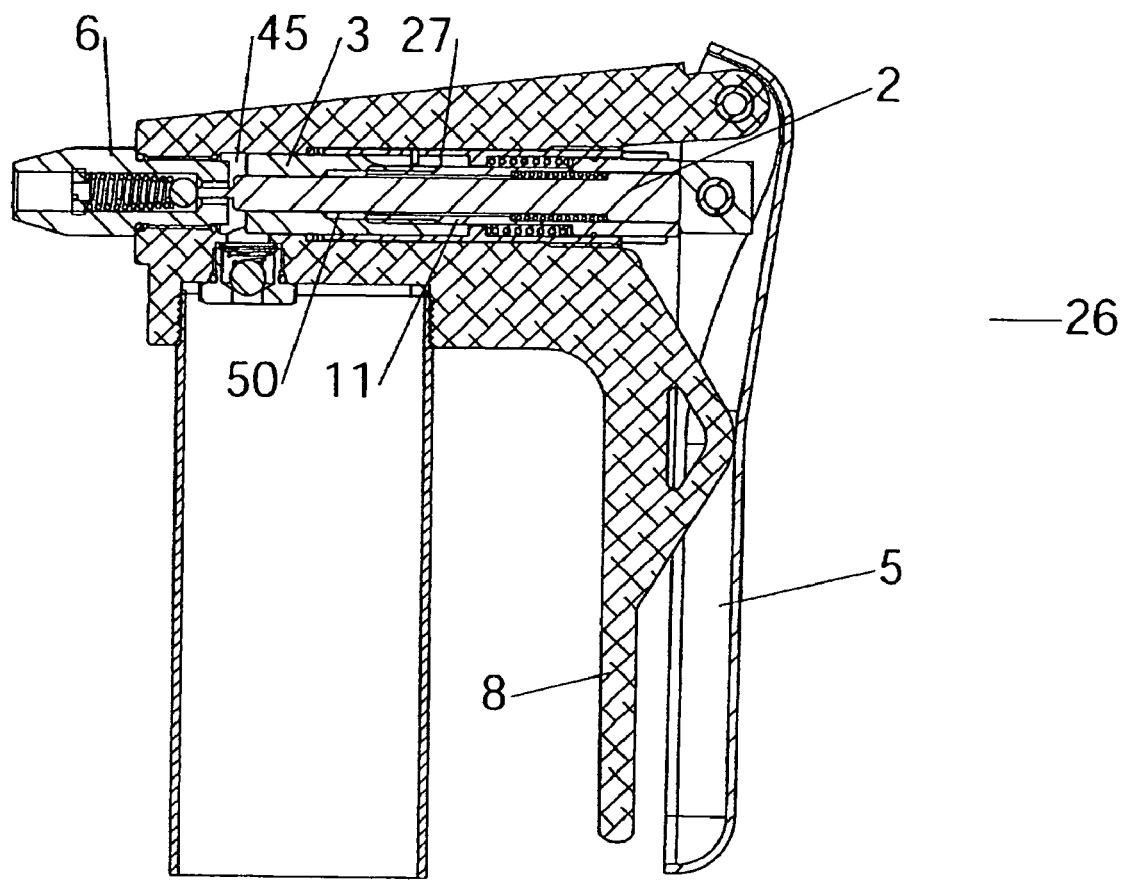
FIG. 8 is a cross section of the preferred embodiment of the grease gun adjusted as in FIG. 6 with the actuating lever shown abutted to the handle with the pressure plunger advanced maximally into the compression chamber and with the volume plunger advanced partially into the compression chamber.

FIGS. 6-8 illustrate the adjusted position of grease gun 26 in which plunger extension 11 is mounted to volume plunger 3 midway into counterbore 50 thereof. By selective rotation of plunger extension 11 by manipulation of thumb wheel 48, inner end 34 may be moved into an intermediate position along counterbore 50 of volume plunger 3. In this position grease gun 26 is capable of delivering grease at high pressure or at high volume depending on the extent of retraction of the actuating lever 5. Specifically, in FIG. 6, actuating lever 5 is shown fully retracted such that grease gun 26 is ready to expel grease at high pressure, such as when a resistant zerk must be overcome. Volume plunger 3 is stationed at a rest position determined by the retractive urging created by volume plunger spring 12 as limited by internal stop 57 of plunger retainer 9. Pressure plunger 2 is retracted from output body 6 by the urging of pressure plunger spring 13 but such retraction is limited by the abutment of head 39 thereof against push block 4.

As seen in FIG. 7, as actuating lever 5 has moved from a fully retracted position partway toward handle 8, pressure plunger 2 has been urged into compression chamber 45 while volume plunger 3 has remained in its rest position as seen in FIG. 6. As needle 42 of pressure plunger traverses compression chamber 45, grease therein is forced at high pressure past output check ball 20 to be expelled into a zerk (not shown) which would be inserted into a coupler and extension (not shown) attached to output body 6 proximal to output check screw 16. Therefore, high pressure grease could be forced into a resistant zerk to overcome its clog or seizure. From the position of actuating lever 5 seen in FIG. 7, grease gun 26 is in condition to deliver grease at low pressure as actuating lever 5 continues to be moved toward handle 8.

FIG. 8 illustrates the position of volume plunger 3 and pressure plunger 2 after actuating lever 5 has completed its travel and come into abutment with handle 8. Volume plunger 3 has advanced substantially into compression chamber 45 coincident with movement of pressure plunger 2, with plunger assembly 27 propelling grease from compression chamber 45 through output body 6 at high volume and low pressure.

Therefore it should be understood that grease gun 26 may be adjusted to deliver grease at high pressure and low volume when inner end 34 of plunger extension 11 is maximally inserted into counterbore 50 of volume plunger 3. However, when inner end 34 of plunger extension 11 is minimally inserted into counterbore 50 of volume plunger 3, grease gun 26 will expel grease at low pressure and high volume. Furthermore, plunger assembly 27 may be adjusted such that a first portion of the stroke of actuating lever 5 from its fully retracted position will deliver grease at high pressure while a remaining portion of the stroke of the actuating lever 5 will deliver grease at low pressure. This adjustment is made by varying the depth of insertion of inner end 34 of plunger extension 11 into counterbore 50 of volume plunger. By selective adjustment, the proportion of stroke of the actuating lever 5 which causes the grease gun 26 to deliver high pressure grease may be varied, that is, the shorter the effective length of the combination of the volume plunger 3 and the plunger extension 11, the larger the proportion of stroke of the actuating lever 5 from its fully retracted position which will deliver high pressure grease from grease gun 26. As the effective length of the volume plunger 3 and plunger extension 11 increases, the smaller the proportion of the stroke of actuating lever 5 from full retraction will be which causes the grease gun 26 to deliver high pressure grease, with the remainder of the compression stroke of actuating lever 5 toward handle 8 causing low pressure grease to be expelled from grease gun 26.

An additional embodiment of a two-stage grease gun 100 according to the present invention is illustrated in FIGS. 9-16. This gun 100 may be fed with a reusable barrel that may be bulk loaded with grease (typically about 16 ounces) or loaded with a disposable cartridge (typically containing about 14.5 ounces). This gun 100 can develop over 10,000 psi of pressure in a high pressure, or boost mode. The high pressure is sometimes required to unblock a plugged grease fitting (zerk). Once the blockage is overcome, the gun 100 can be switched to a low pressure high volume mode to deliver the nominal amount of grease—preferably about one ounce of grease in twenty-two (22) strokes. The gun 100 uses two diameters of pistons with the smaller alternately able to slide inside the larger or engage the larger and translate both in unison in order to accomplish the two-stages. This gun 100 preferably has a handle 140 long enough to permit two-handed operation.

As best seen in FIGS. 9-12, the gun 100 includes a gun body 101 that has an outlet valve 109 for dispensing grease. The gun body 101 may be formed from die cast aluminum, injection molded plastic, or by other known materials and mechanisms. A grease reservoir 150, such as a reusable barrel or a disposable cartridge is connected to generally to a lower portion of the body 101. An actuating lever 102 is pivotally attached at the rear of the gun body 101. Preferably the handle 140 is long enough to permit two-handed operation. The actuating lever 102 is pinned to the body 101 by pivot member 130. A toggle lever 121 may be adjusted up or down about sixty degrees (60°) to move between the boost mode and the volume mode. In the embodiment shown in FIGS. 9-16, the gun 100 is in the boost mode when the toggle lever 121 is adjusted to the upper position shown in FIG. 9, and can be adjusted to the volume mode by moving the toggle lever 121 downwardly.

Figure 9:
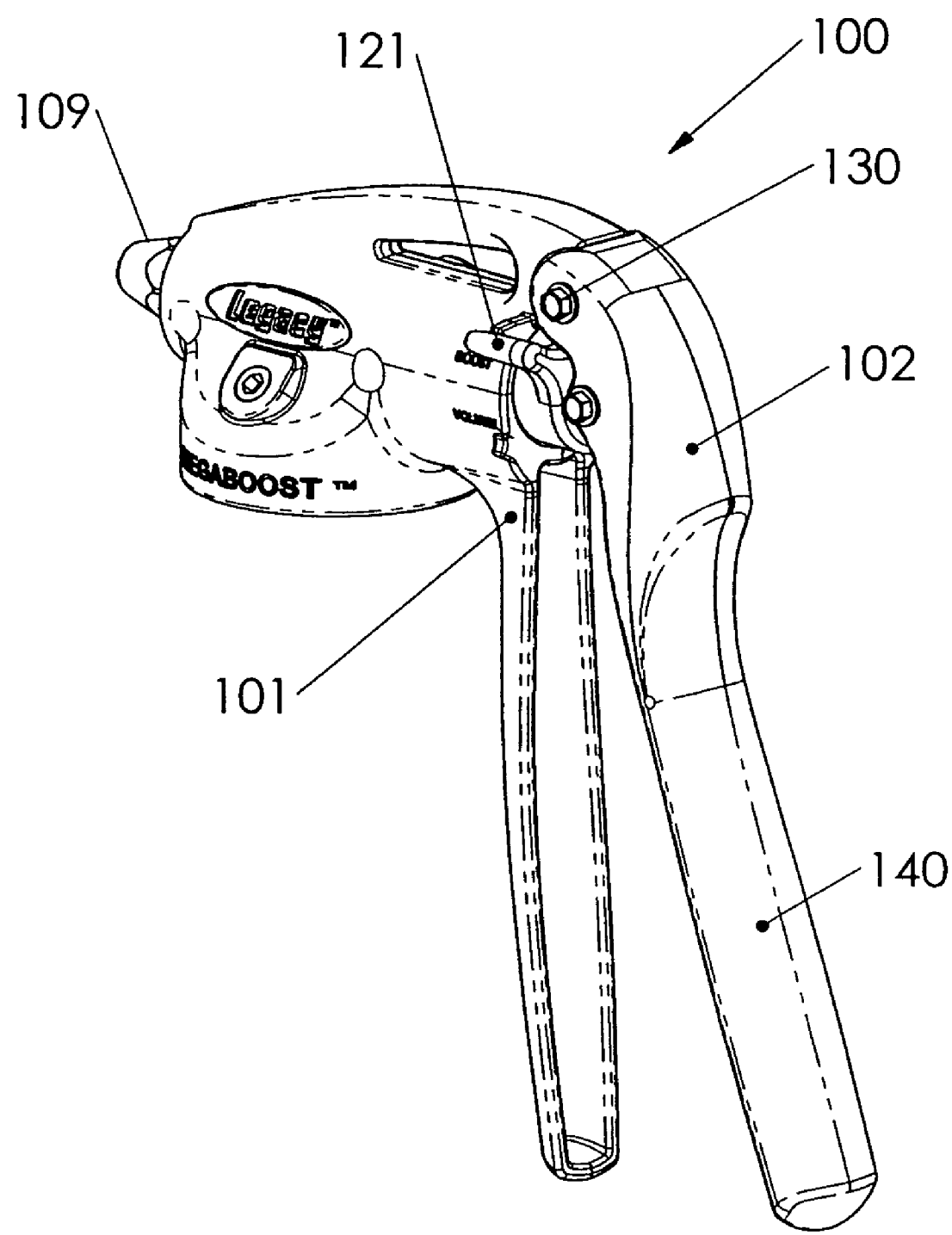
FIG. 9 is an isometric view of a grease gun according to an alternative embodiment of the present invention.
Figures 10, 11:
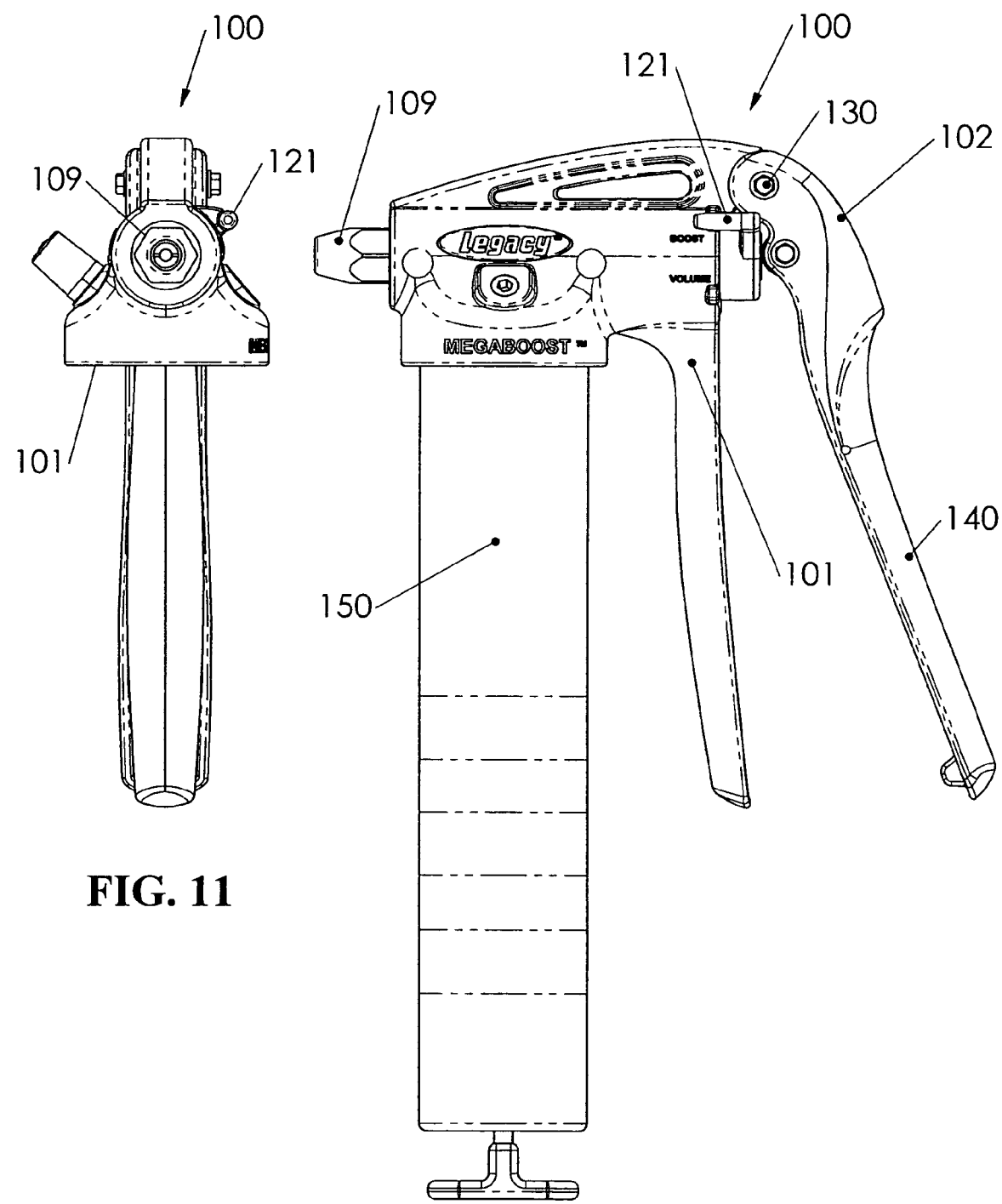
FIG. 10 is a side elevational view of the grease gun of FIG. 9.
FIG. 11 is a front elevational view of the grease gun of FIG. 9.
Figure 12:
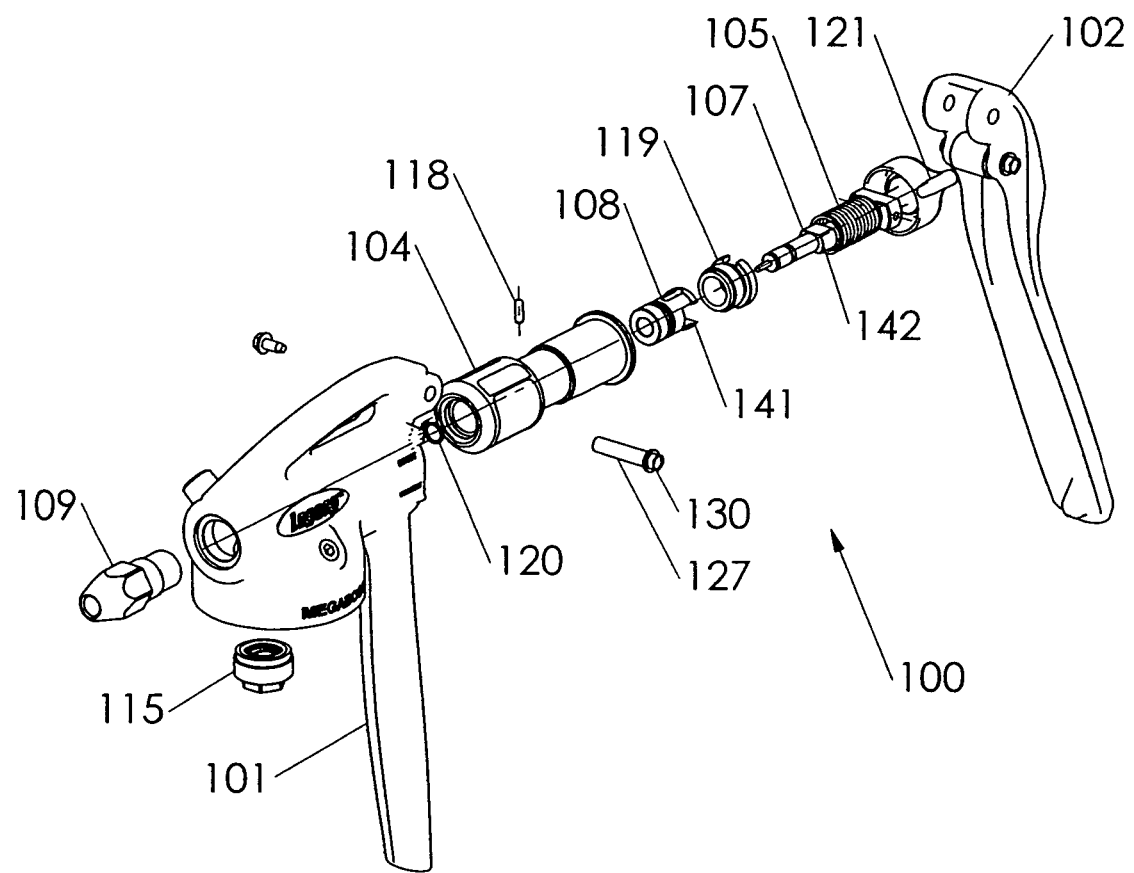
FIG. 12 is an exploded view of the grease gun of FIG. 9.

The inner working of the gun 100 can best be seen in FIG. 12, which provides an exploded view of the gun 100 from FIG. 9. Outlet valve 109 and inlet valve 115 attach to front and lower portions of the body 101 respectively. According to one embodiment, the outlet valve 109 and inlet valve 115 are metal fittings that are molded into a plastic body 101. Alternatively, the outlet valve 109 and inlet valve 115 may be threaded such that they screw into their respective positions. A piston housing 104 is provided within the gun body 101 to house a piston assembly. According to one embodiment, the housing 104 is molded into the body 101 and is threaded for mated engagement with the outlet valve 109.

A volume piston 108 is slidably provided within piston housing 104. The volume piston 108 has an opening in its front face. Boost piston 107 is also slidably provided within housing 104, and has a front portion that extends through the opening in the front face of the volume piston 108. A retaining ring 120 is snap fit on the end of the boost piston 107 to retain the front portion of the boost piston 107 on the front, or outlet, side of the front face of the volume piston 108. Stop ring 119 is threaded into the housing 104 to limit rearward travel of the volume piston 108. A piston spring 105 is provided between the stop ring 119 and a shoulder formed on the inner piston 107 to urge the inner piston 107 rearwardly away from the outlet 109. The rearward travel of the inner piston 107 is constrained by the volume piston 108 bearing against the stop ring 119 and the retaining ring 120 bearing against the volume piston 108.

The rear portion of the volume piston 108 is provided with a slot or recessed portion 141. The inner piston 107 is provided with a key portion 142 that is milled flat, such that when the inner piston is rotated to a mating alignment, the key portion 142 will fit into the recessed portion 141, permitting the inner piston 107 to slide forward relative to the volume piston 108. When the key portion 142 is not in mating alignment with the recessed portion 141, the key portion 142 will press against the rear of the volume piston 108, causing the inner piston 107 and volume piston 108 to move forward together as a unit. The inner piston 107 can be rotated within the housing 104 by adjusting toggle lever 121. Pin 118 engages housing 104 and volume piston 108 to prevent rotation of the volume piston 108 relative to the housing. The volume piston 108 is provided with a longitudinal slot to receive the pin 118, such that longitudinal sliding the volume piston 108 relative to the housing 104 is permitted.

Figure 13:
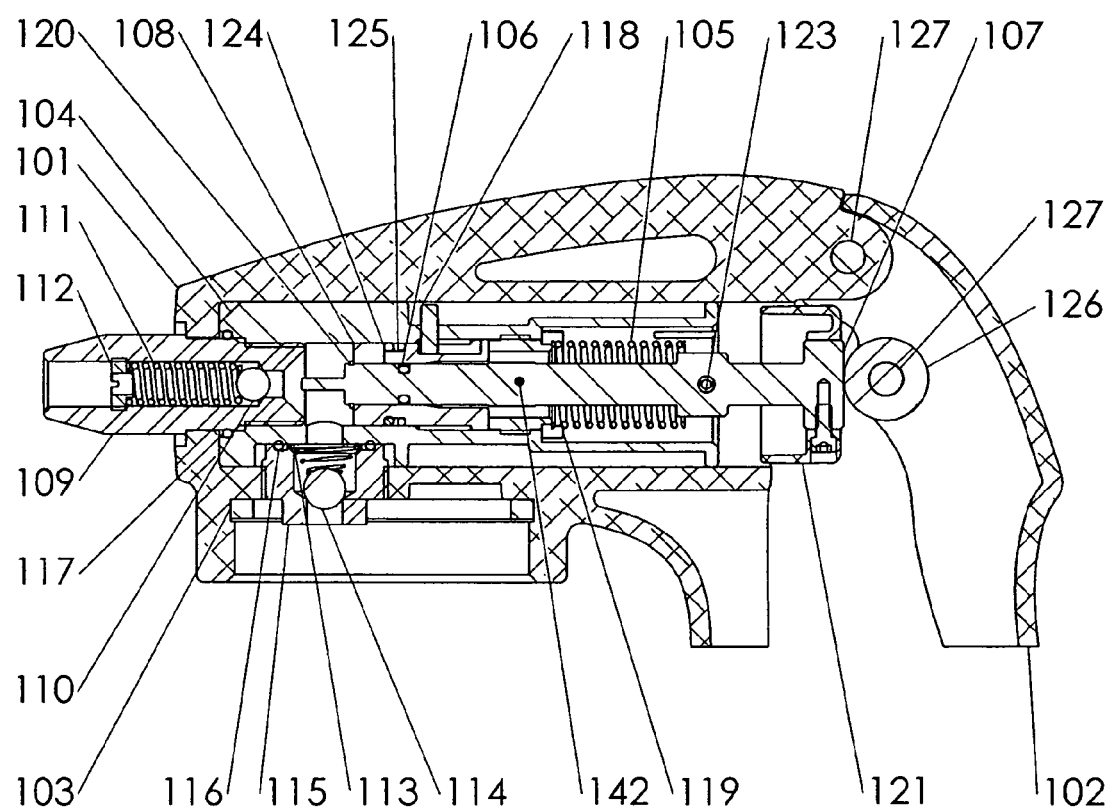
FIG. 13 is a partial cross-section view of the grease gun of FIG. 9 adjusted to a high pressure mode with the actuating lever in a retracted neutral position.

Additional structure of the gun 100 can be seen in the cross-section view of FIG. 13. A gasket 103 may be provided to seal the grease reservoir 150 (not shown in FIG. 13, see FIG. 10) with the gun body 101. The inlet valve body 115 is sealed to the housing 104 by a seal ring 116. A ball 114 and spring 113 are used to provide a one-way valve arrangement within inlet valve body 115. The outlet valve 109 works as described above with respect to the other embodiments of the present invention. In particular, a set screw 112 is used to adjust the resistance of spring 111 bearing against ball 110. A seal ring 117 is provided to seal the outlet valve body 109 to the housing 104.

Sealing ring 106 seals the inner piston 107 with the volume piston 108. Likewise, sealing rings 124 and 125 seal the volume piston 108 with housing 104.

Bearing 126 is mounted to actuating lever 102 by pin 127 to bear against the rear face of inner piston 107. Preferably the bearing 126 is rotatably mounted to the lever 102.

Figure 14:
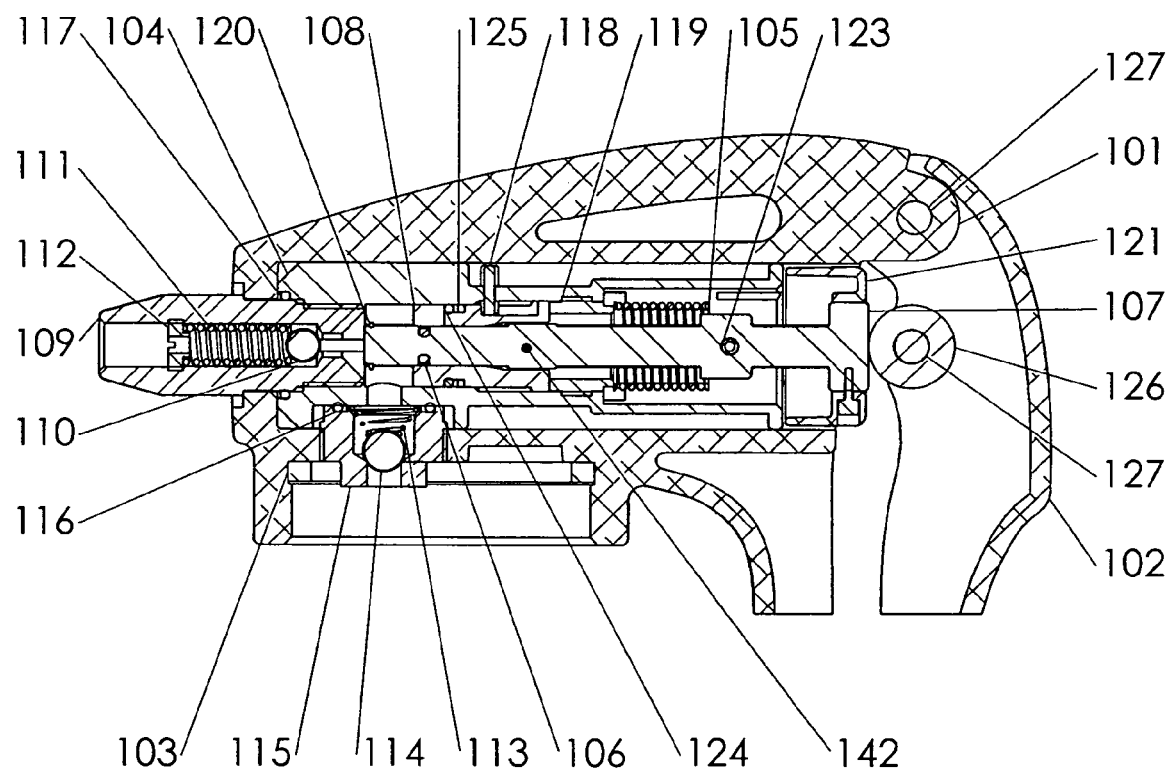
FIG. 14 is a partial cross-section view of the grease gun of FIG. 9 adjusted to a high pressure mode with the actuating lever in a closed position.

FIGS. 13 and 14 show the gun 100 adjusted into a boost mode. In FIG. 13, the actuating lever 102 is in a neutral position, and the inner and volume pistons 107 and 108 are withdrawn to their rearward most positions, such that the cavity behind the outlet 109 contains a full load of grease. In FIG. 14, the lever 102 has been squeezed (in a clockwise direction as shown), to press the bearing 126 against the inner piston 107, causing the inner piston to translate forward towards the outlet 109. Because the toggle switch 121 is in the boost mode, the key portion 142 of the inner piston 107 is matingly aligned with the recessed portion of the volume piston 108, and the inner piston 107 will slide through the volume piston 108, driving the front portion of the inner piston 107 towards the outlet 109. A volume of grease corresponding to the volume displaced by the inner piston 107 is forced through the outlet 109. Because the force of the actuating lever 102 is transmitted through the small surface area of the front face of the inner piston 107, a high outlet pressure can be generated if a clogged zerk is encountered. If the actuating lever is released, the spring 105 will return the inner piston 107 and the actuating lever 102 to the position of FIG. 13. It should be appreciated that as the inner piston 107 withdraws back to the neutral position, the resulting vacuum will draw in additional grease through the inlet valve 115.

Figure 15:
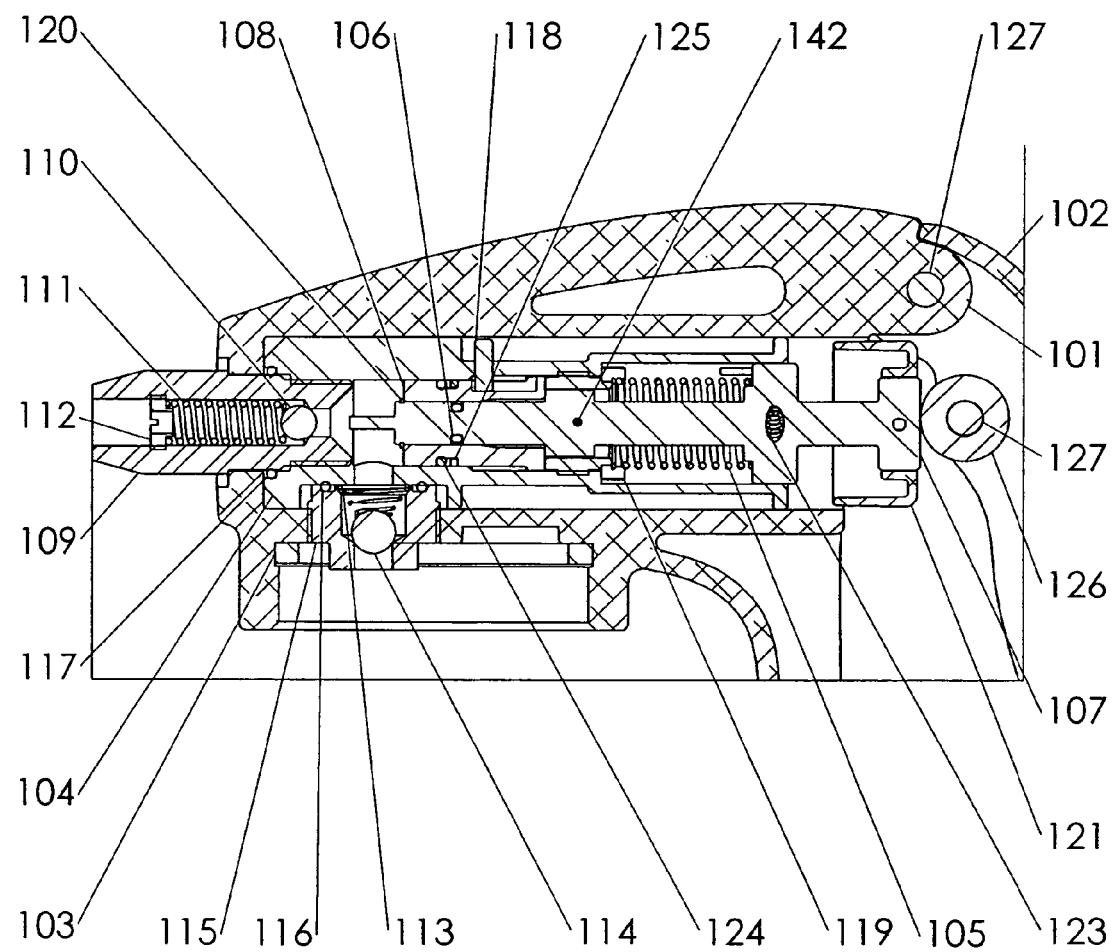
FIG. 15 is a partial cross-section view of the grease gun of FIG. 9 adjusted to a high volume mode with the actuating lever in a retracted neutral position.
Figure 16:
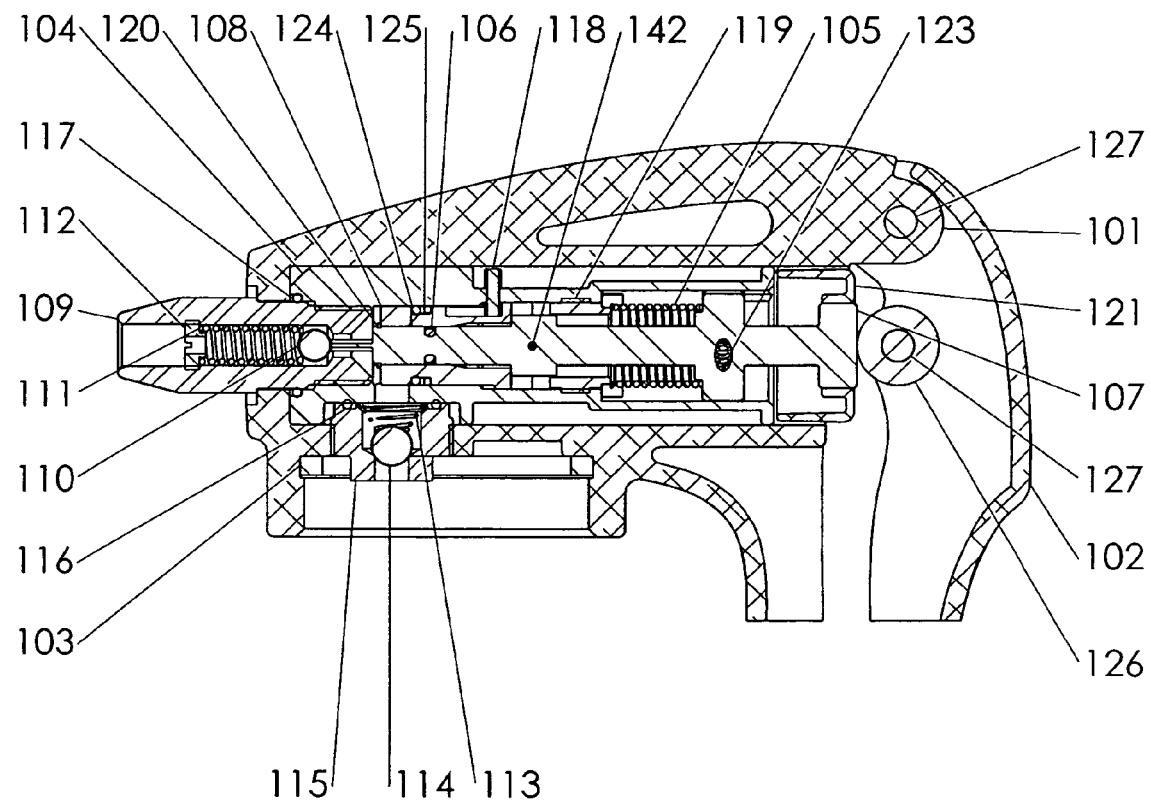
FIG. 16 is a partial cross-section view of the grease gun of FIG. 9 adjusted to a high volume mode with the actuating lever in a closed position.

FIGS. 15 and 16 show the gun 100 adjusted into a high volume mode. In FIG. 15, the actuating lever 102 is in a neutral position, and the inner and volume pistons 107 and 108 are withdrawn to their rearward most positions, such that the cavity behind the outlet 109 contains a full load of grease. In FIG. 16, the lever 102 has been squeezed (in a clockwise direction as shown), to press the bearing 126 against the inner piston 107, causing the inner piston to translate forward towards the outlet 109. Because the toggle switch 121 is in the volume mode position, the key portion 142 of the inner piston 107 bears against the rear of the volume piston 108, causing the two pistons 107 and 108 to move forward as a unit. As shown, the outer diameter of the volume piston 108 is about twice that of the inner piston 107. Accordingly, the combination of the volume piston 108 and the inner piston 107 displace about four times as much volume during a single stroke as compared to the inner piston 107 alone. Correspondingly, the combination of the volume piston 108 and the inner piston 107 can generate about one fourth of the pressure based on the same input force applied by the actuating lever 102. If the actuating lever 102 is released, the spring 105 will return the inner piston 107, the volume piston, and the actuating lever 102 to the position of FIG. 15.

Accordingly, grease gun 100 may be fed from a 16 oz barrel, and can develop over 10,000 psi of pressure. This pressure is sometimes required to unblock a plugged grease fitting. Once the blockage is overcome, the gun 100 can be switched to the volume mode to deliver the nominal amount of grease—preferably about one ounce of grease in 22 strokes. The feature that allows this is primarily the use of two diameters of piston with the smaller alternately able to slide inside the larger or engage the larger and translate both in unison.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, what is claimed is:

1. A grease gun comprising
    a grease gun body having a passageway therethrough,
    an actuating lever pivotal upon the grease gun body,
    a first plunger longitudinally slidable within the passageway over a limited distance,
    the first plunger having a longitudinal passageway therethrough,
    a second plunger rotatably received in the longitudinal passageway of the first plunger,
        the second plunger being rotatable between a high pressure orientation wherein the second plunger will slide within the first plunger and a nominal orientation wherein the second plunger moves in unison with the first plunger,
    movement of the actuating lever from a retracted position towards a closed position with the second plunger in a high pressure orientation effects movement of the second plunger within the longitudinal passageway,
    movement of the actuating lever from the retracted position towards the closed position with the second plunger in a nominal orientation effects movement of the first and second plungers in unison.

2. The grease gun of claim 1 further comprising a grease reservoir for grease connected to a portion of the grease gun body.

3. The grease gun of claim 1, wherein the high pressure orientation supplies a pressure sufficient to unblock a plugged grease fitting.

4. The grease gun of claim 1, wherein the first plunger comprises a first diameter and the second plunger comprises a second, smaller diameter.

5. The grease gun of claim 1 in which the grease gun body is formed from components selected from the group consisting of die-cast aluminum, zinc, magnesium and injection molded plastic.

6. The grease gun of claim 1 further comprising a lever for selection of at least one of the high pressure orientation and the nominal orientation.

7. The grease gun of claim 6, wherein the lever is rotatable.

8. The grease gun of claim 7, wherein the rotatable lever is rotated 60 degrees to move between the high pressure orientation and the nominal orientation.

9. The grease gun of claim 1 in which the first plunger is provided with a recessed portion and the second plunger is provided with a key portion such that it will mate with the recessed portion.

10. The grease gun of claim 1 further comprising a spring return operably connected to at least one of the first plunger and the second plunger.

11. A grease gun comprising:
    a grease gun body having a passageway;
    an actuating lever operably attached to the grease gun for displacement of grease;
    a first plunger slidable within the passageway, the first plunger having a longitudinal passageway; and
    a second plunger rotatably received in the longitudinal passageway of the first plunger, the second plunger being rotatable between a high pressure orientation wherein the second plunger will slide within the first plunger and a nominal orientation wherein the second plunger will move in unison with the first plunger.

12. The grease gun of claim 11, further comprising a lever for selection between the high pressure orientation and the nominal orientation.

13. The grease gun of claim 12 wherein the lever is rotatable.

14. The grease gun of claim 11, in which the actuating lever is operably connected to the second plunger such that movement of the actuating lever with the second plunger in the high pressure orientation effects movement of the second plunger within the longitudinal passageway of the first plunger.

15. The grease gun of claim 11, in which the actuating lever is operably connected to the second plunger such that movement of the actuating lever with the second plunger in the nominal orientation effects movement of the second plunger in unison with the first plunger.

* * * * *